US012621167B2

(12) United States Patent
Chu

(10) Patent No.: US 12,621,167 B2
(45) Date of Patent: May 5, 2026

(54) METHOD OF UPDATING DEVICE CERTIFICATE AND DEVICE FOR DRIVING THE METHOD

(71) Applicant: Samsung Electronics Co., Ltd., Suwon-si (KR)

(72) Inventor: Younsung Chu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 316 days.

(21) Appl. No.: 18/458,070

(22) Filed: Aug. 29, 2023

(65) Prior Publication Data

US 2024/0073033 A1 Feb. 29, 2024

(30) Foreign Application Priority Data

Aug. 31, 2022 (KR) ........................ 10-2022-0110324

(51) Int. Cl.
*H04L 9/32* (2006.01)
(52) U.S. Cl.
CPC .......... *H04L 9/3265* (2013.01); *H04L 9/3268* (2013.01)
(58) Field of Classification Search
CPC ............................ H04L 9/3265; H04L 9/3268
See application file for complete search history.

(56) References Cited

U.S. PATENT DOCUMENTS 7,913,086 B2 3/2011 Kostiainen et al.
8,914,627 B2 12/2014 Park et al.

9,164,756 B2 10/2015 Durand
9,904,806 B2 2/2018 Ju
9,959,125 B2 5/2018 Siluvainathan et al.
10,931,652 B2 * 2/2021 Costa .................. G06F 21/6209
(Continued)

FOREIGN PATENT DOCUMENTS

KR 10-2019-0036779 A 4/2019
KR 10-2022-0065223 A 5/2022

OTHER PUBLICATIONS

Extended European Search Report for corresponding European Patent Application No. 23194683.1 issued on Jan. 23, 2024.

(Continued)

*Primary Examiner* — Techane Gergiso
(74) *Attorney, Agent, or Firm* — Harness, Dickey & Pierce, P.L.C.

(57) ABSTRACT

A device may include processing circuitry configured to, generate a device identifier associated with the device, and generate a unique endorsement identity (ID) associated with the device identifier, a first layer sub-circuit configured to, receive the device identifier, and generate a first certificate and a second certificate based on the device identifier and the unique endorsement ID, the first certificate and the second certificate including information to authenticate the device, and the processing circuitry is further configured to, receive the first certificate and the second certificate, and verify whether the device has been modified based on the first certificate and the second certificate, wherein, in response to the first layer sub-circuit being modified, the first layer sub-circuit is further configured to, generate an endorsement key based on a new unique endorsement ID, and generate a certificate signing request for the new unique endorsement ID based on the endorsement key.

18 Claims, 15 Drawing Sheets

(56)  References Cited

U.S. PATENT DOCUMENTS

| 12,124,833 | B2 * | 10/2024 | Izzo | ...................... | H04L 9/3268 |
|---|---|---|---|---|---|
| 2007/0016801 | A1 * | 1/2007 | Bade | .................... | H04L 9/3234 |
| | | | | | 713/193 |
| 2015/0074780 | A1 * | 3/2015 | Schell | ................. | H04W 12/086 |
| | | | | | 726/3 |
| 2018/0234255 | A1 * | 8/2018 | Fu | ............................. | H04L 9/30 |
| 2020/0242249 | A1 * | 7/2020 | Kumar | ................ | H04L 63/0823 |
| 2021/0314365 | A1 * | 10/2021 | Smith | ................... | G06F 11/301 |
| 2022/0012187 | A1 * | 1/2022 | Contreras Munoz | ... | G06F 21/44 |
| 2022/0222348 | A1 * | 7/2022 | Vaswani | ............... | H04L 9/3073 |
| 2023/0125636 | A1 * | 4/2023 | Dover | ................... | H04L 9/0825 |
| | | | | | 713/171 |
| 2023/0239165 | A1 * | 7/2023 | Young | ................... | H04L 9/3265 |
| | | | | | 713/175 |
| 2023/0367575 | A1 * | 11/2023 | Izzo | ........................ | H04L 9/088 |

OTHER PUBLICATIONS

Ronald Aigner et al: "Device Identity with DICE and Rlot: Keys and
certificates (Draft for Review)", Microsoft Confidential—Draft for
Review, Sep. 1, 2017 (Sep. 1, 2017), pp. 1-15, XP055603767.

* cited by examiner

METHOD OF UPDATING DEVICE CERTIFICATE AND DEVICE FOR DRIVING THE METHOD

CROSS-REFERENCE TO RELATED APPLICATION

This U.S. non-provisional application is based on and claims the benefit of priority under 35 U.S.C. § 119 to Korean Patent Application No. 10-2022-0110324, filed on Aug. 31, 2022, in the Korean Intellectual Property Office, the disclosure of which is incorporated by reference herein in its entirety.

BACKGROUND

Various example embodiments of the inventive concepts relate to a method of updating a device certificate, a non-transitory computer readable medium including computer readable instructions for performing the method, and/or a device for performing the method, etc., and more particularly, to a method of verifying a certificate for identification of a device and updating a certificate chain when a device is changed, updated, and/or modified, etc.

Generally, in a public key infrastructure (PKI), a digital signature is generated between devices by using a private key, and the digital signature is verified by using a public key. In the PKI, a certificate authority issues a certificate to endorse the public key, and verify whether a public key issued by the certificate authority is correct through chain verification of the certificate to verify the public key of a device.

When a manufacturing subject of a device is changed, the certification authority issues a new certificate. In this case, a secure protocol and data model (SPDM) is used.

SUMMARY

According to at least one example embodiment, a device generating a security signal associated with a secure protocol and data model (SPDM) may include read-only memory (ROM), a device identify certificate engine, a bootloader, and/or firmware, etc., and in response to the bootloader being updated by the subject of usage of the device, an error may occur while the device is driven.

Various example embodiments of the inventive concepts provide a method of updating a certificate, wherein the method enables a normal operation of a device even when a bootloader is changed.

According to at least one example embodiment of the inventive concepts, there is provided a device including processing circuitry configured to, generate a device identifier associated with the device, and generate a unique endorsement identity (ID) associated with the device identifier, a first layer sub-circuit configured to, receive the device identifier, and generate a first certificate and a second certificate based on the device identifier and the unique endorsement ID, the first certificate and the second certificate including information to authenticate the device, and the processing circuitry is further configured to, receive the first certificate and the second certificate, and verify whether the device has been modified based on the first certificate and the second certificate, wherein, in response to the first layer sub-circuit being modified, the first layer sub-circuit is further configured to, generate an endorsement key based on a new unique endorsement ID, and generate a certificate signing request for the new unique endorsement ID based on the endorsement key.

According to at least one example embodiment of the inventive concepts, there is provided a method of updating a device certificate, the method including generating a device identifier associated with a desired device, generating a unique endorsement identity (ID) associated with the device identifier, transmitting the device identifier to a first layer sub-circuit, the transmitting causing the first layer sub-circuit to, generate a first certificate and a second certificate based on the device identifier and the unique endorsement ID, the first certificate and the second certificate including information to authenticate the desired device, receiving the first certificate and the second certificate, and verifying whether the desired device has been modified based on the first certificate and the second certificate, wherein, in response to the first layer being modified, the first layer sub-circuit is further caused to generate the first certificate and the second certificate by generating an endorsement key based on a new unique endorsement ID, and generating a certificate signing request for the new unique endorsement ID based on the endorsement key.

According to at least one example embodiment of the inventive concepts, there is provided a method of updating a certificate of a device, the method including, verifying an intermediate certificate based on a first certificate chain of a root certificate, verifying whether a bootloader of the device has been modified based on a second certificate chain of the intermediate certificate, and updating a device certificate chain to the intermediate certificate based on a device certificate signing request and results of the verifying whether the bootloader of the device has been modified.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Various example embodiments of the inventive concepts will now be described more fully with reference to the accompanying drawings.

Figure 1:
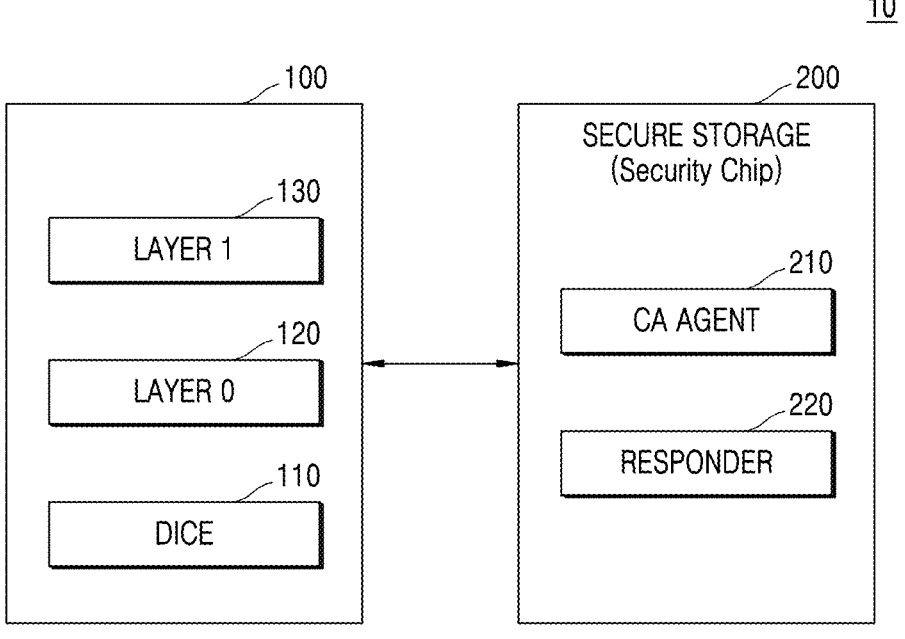
FIG. 1 is a block diagram of a device according to at least one example embodiment.

FIG. 1 is a block diagram of a device 10 according to at least one example embodiment.

Referring to FIG. 1, the device 10 according to at least one example embodiment may include at least one processor 100 and/or at least one secure storage 200, etc., but is not limited thereto. For example, the device 10 may include a greater or lesser number of constituent components.

As shown in FIG. 1, the device 10 may process data as an electronic device, etc. For example, the processor 100 of the device 10 may be a configuration included in various electronic devices, such as mobile devices, smartphones, personal digital assistants (PDAs), personal computer (PCs), tablet PCs, laptops, netbooks, home appliances, or the like, but the example embodiments are not limited thereto.

The processor 100 may include a device identify certificate engine (DICE) 110, a first layer (LAYER 0) 120, and/or a second layer (LAYER 1) 130, etc., but are not limited thereto. The processor 100, in whole or in part, may be implemented as processing circuitry, and may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The DICE 110 (e.g., a DICE device, a DICE sub-circuit, a DICE sub-component, etc.) may generate a device unique identifier (e.g., a unique identifier for a desired device) and transmit the device unique identifier to the first layer 120. Here, the device unique identifier may be used to generate a device certificate associated with and/or corresponding to the desired device. Also, the device unique identifier may be a unique value generated once, and may be generated by using, for example, a one-time program (OTP). The configuration of the DICE 110 is described in detail with reference to FIGS. 2 and 3.

The first layer 120 (e.g., a first layer device, a first layer sub-circuit, a first layer sub-component, etc.) may receive the device unique identifier from the DICE 110 and generate a device certificate (e.g., a first certificate) and/or an alias certificate (e.g., a second certificate), etc. In addition, the first layer 120 may be a bootloader used to boot a device (e.g., device 10), and/or may transmit a device identity (ID) certificate signing request corresponding to the device 10 to a device certificate authority, but the example embodiments are not limited thereto. Also, the first layer 120 may store an alias key, an alias certificate, a device ID certificate, and/or an endorsement ID certificate, etc., and may provide the same to the second layer 130. For example, the first layer 120 may be configured as random-access memory (RAM) storing an alias key, an alias certificate, a device ID certificate, and/or an endorsement ID certificate, and/or may provide the same to the second layer 130, but is not limited thereto. The first layer 120 is described in detail with reference to FIGS. 2 and 4.

The second layer 130 (e.g., a second layer device, a second layer sub-circuit, a second layer sub-component, etc.) may store a device certificate and/or a device certificate chain, etc. For example, the second layer 130 may be firmware configured to include a certificate authority that identifies the device 10, but is not limited thereto. As another example, the second layer 130 may be secure protocol and data model (SPDM) firmware and may be a layer in which a requester and/or a certificate storage, which will be described below, operate, but the example embodiments are not limited thereto. The second layer 130 may receive an alias key, an alias certificate, a device ID certificate, and/or an endorsement ID certificate, etc., from the first layer 120, and may perform according to and/or based on an SPDM protocol, but is not limited thereto. The second layer 130 is described in detail below with reference to FIGS. 2 and 5.

The secure storage 200 (e.g., security storage device, security storage circuitry, etc.) may be implemented as an integrated circuit (IC) and/or an semiconductor chip, and accordingly, the secure storage 200 may be referred to as a security chip, but the example embodiments are not limited thereto. The secure storage 200 may include at least one processor and/or an encryption engine therein (e.g., processing circuitry), and various functions performed therein may be implemented by embedded hardware and/or a combination of embedded software and hardware, etc. Hardware and/or software implemented in the secure storage 200 may perform at least one operation related to certificate generation and/or at least one operation related to encryption/decryption in a public key infrastructure (PKI), etc., but is not limited thereto.

The secure storage 200 may include at least one unit (e.g., a component, a module, a device, a circuit, circuitry, etc.) capable of protecting information therein from external attacks. For example, the secure storage 200 may include a protection unit (e.g., a protection device, a protection sub-circuit, etc.) implemented as hardware and/or a combination of hardware and software, and may block access to information and/or data stored inside the secure storage 200 from the outside (e.g., from an external source) through the protection unit and/or change the information and/or data even when the information and/or data stored inside the secure storage 200 is accessed from the outside (e.g., from an external source), thereby decreasing and/or preventing leakage of original information and/or data to the outside (e.g., the external source).

One or more keys related to public key-based communication are installed and/or stored in the secure storage 200, and various arithmetic operations and/or security related operations using the stored keys may be performed. For example, the secure storage 200 may store at least one private key (e.g., a certificate private key CA-SK, etc.) related to certificate generation, but is not limited thereto. In addition, the secure storage 200 may store at least one key pair (e.g., a device public key DEV-PK and a corresponding device private key DEV-SK, etc.) for performing public key-based communication, but the example embodiments are not limited thereto. For example, in the secure storage 200, at least one key pair may be installed and/or stored during a manufacturing process thereof, but the example embodiments are not limited thereto. In at least one other example embodiment, the secure storage 200 includes software (not shown) for generating a key pair therein, the device public key DEV-PK and the device private key DEV-SK may also be generated when the secure storage 200 is initially driven, etc.

The device 10 may communicate with at least one external device according to and/or based on a secure protocol (e.g., a security protocol, an encryption protocol, etc.), such as an SPDM protocol or the like. For example, in public key-based communication, an operation using important information (e.g., information to be secured, encrypted, etc.) that is to be protected, kept confidential, is to be secured, and/or encrypted, etc., may be processed by a responder 220 (e.g., a responder device, a responder sub-circuit, etc.), and a result of the operation may be provided to the first layer 120.

For example, in cryptographic operations, such as Rivest Shamir Adleman (RSA), elliptic curve cryptography (ECC), digital signature standard (DSS), or the like, an operation using the device private key DEV-SK may be performed by the responder 220. Also, signing (e.g., RSA Sign) using the device private key DEV-SK, which is performed for authentication of the device 10, may be performed by a certificate authority (CA) agent 210 (e.g., CA agent device, CA agent sub-circuit, etc.). Also, the responder 220 may receive data processed according to and/or based on a secure protocol (e.g., security protocol, encryption protocol, etc.) from a requester (e.g., a requesting device, a requesting sub-circuit, etc.). The requester is described in detail with reference to FIG. 4.

According to the above configuration, the device 10 may safely issue a certificate without exposing important information (e.g., information to be secured, encrypted, kept confidential, etc.), such as a certificate private key and/or a device private key, etc., and may also perform a safe secure protocol, but is not limited thereto. That is, in an operation of issuing a certificate and/or performing communication according to and/or based on a secure protocol, the possibility of exposing private keys stored on the device 10 may be reduced compared to a case where a certificate private key and/or a device private key are encrypted and used in a conventional software manner.

Figure 2:
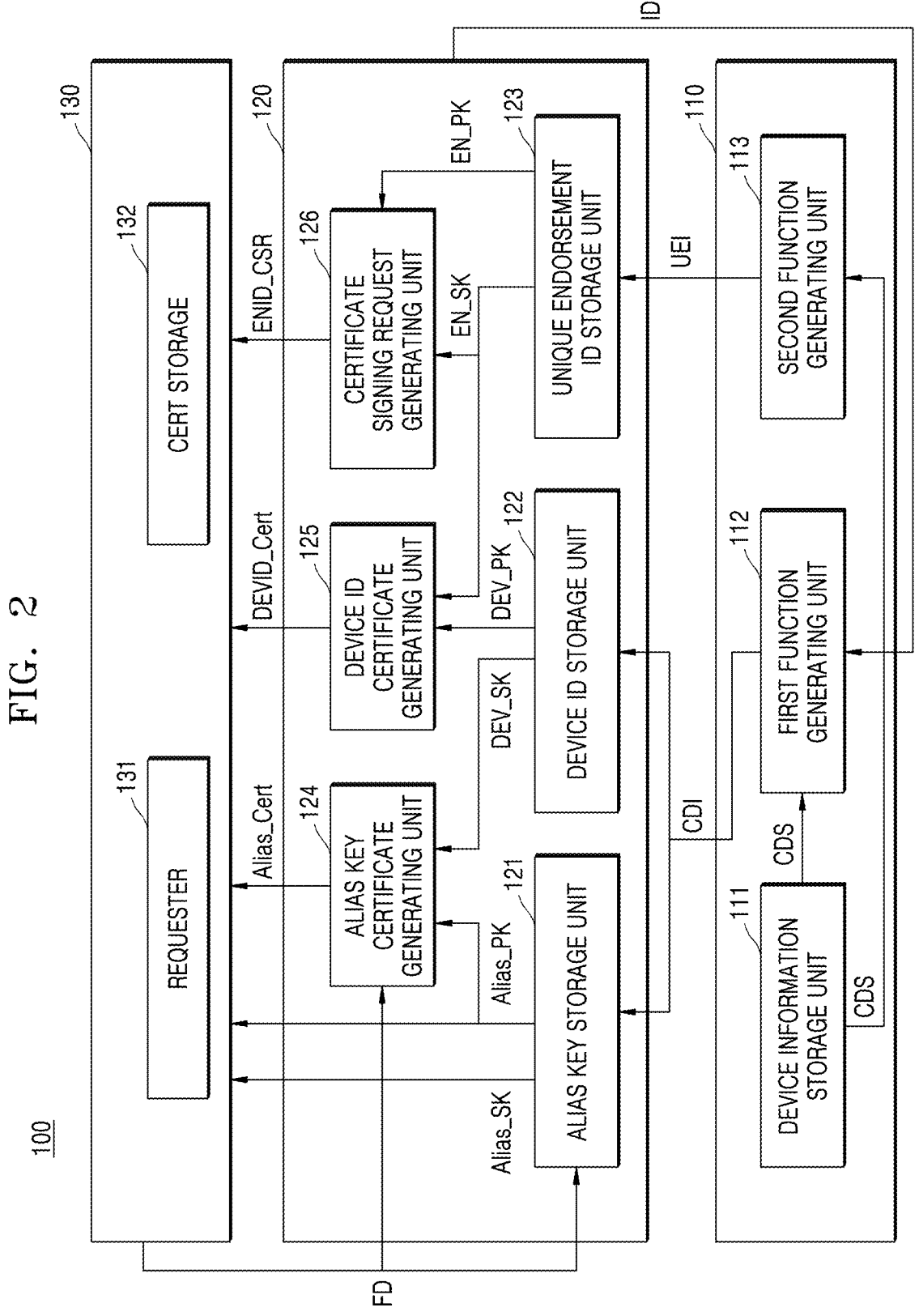
FIG. 2 is a block diagram of a processor according to at least one example embodiment.
Figure 4:
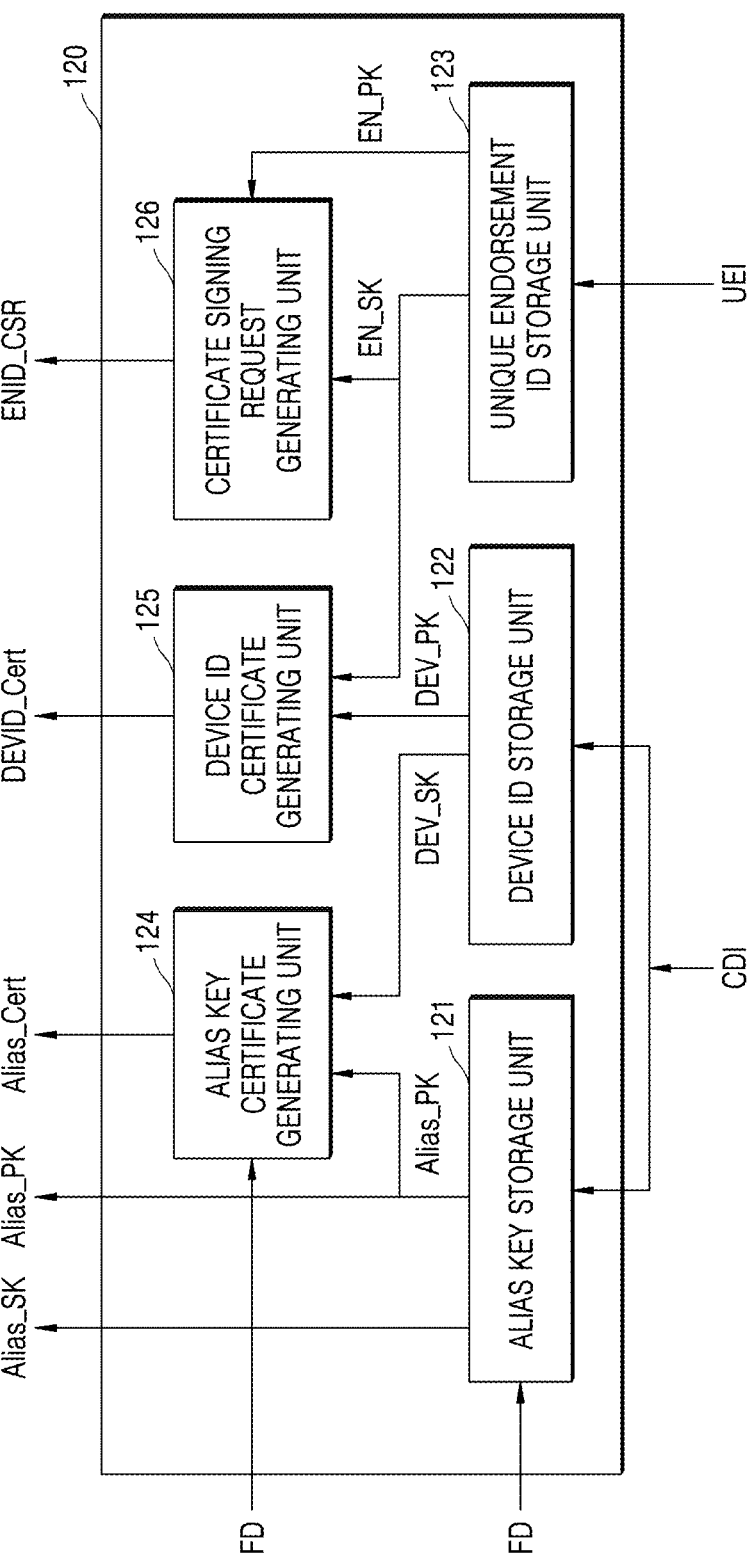
FIG. 4 illustrates a first layer according to at least one example embodiment.
Figure 5:
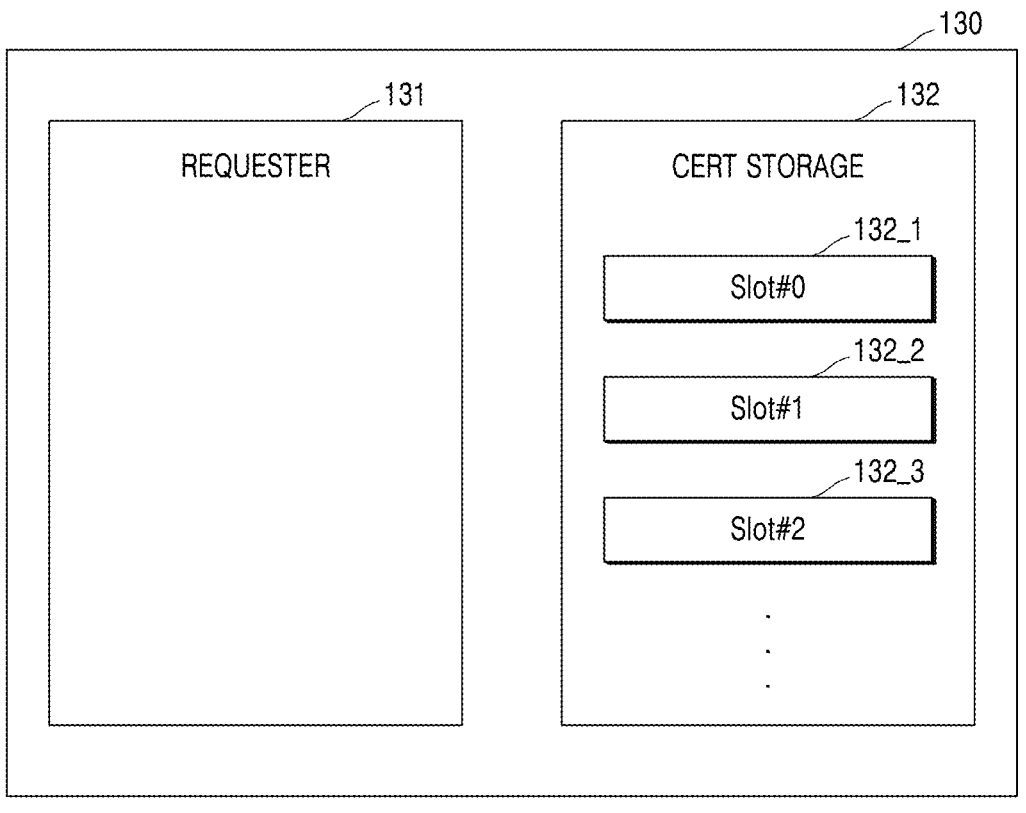
FIG. 5 illustrates a second layer according to at least one example embodiment.

FIG. 2 is a block diagram of the processor 100 according to at least one example embodiment. Also, FIG. 3 illustrates a device identify certificate engine according to at least one example embodiment, FIG. 4 illustrates a first layer according to at least one example embodiment, and FIG. 5 illustrates a second layer according to at least one example embodiment.

Figure 3:
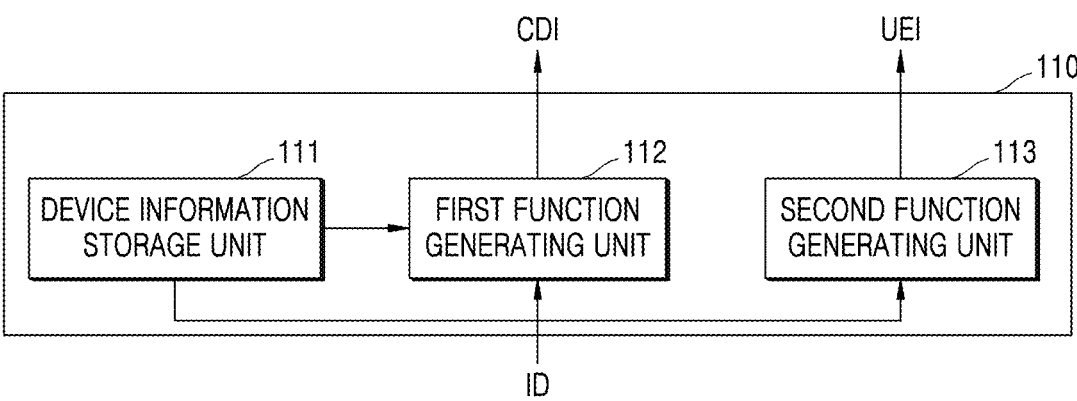
FIG. 3 illustrates a device identify certificate engine according to at least one example embodiment.

Referring to FIGS. 2 and 3, the processor 100 may include a DICE 110, a first layer 120, and/or a second layer 130, etc., but is not limited thereto.

The DICE 110 may include a device information storage unit 111, a first function generating unit 112, and/or a second function generating unit 113, etc., but is not limited thereto.

In the device information storage unit 111 (e.g., device information storage device, device information storage circuit, etc.), device unique information may be stored and/or previously stored during at least one operation of manufacturing the device 10, but the example embodiments are not limited thereto. For example, the device information storage unit 111 may include a NOR flash memory and/or a NAND flash memory, etc., and may be stored in a desired and/or an arbitrary area of an OTP area, but is not limited thereto. In addition, the device information storage unit 111 may exist in the form of hardware, and the stored device unique information may be accessed through, for example, a cyber resilient embedded systems (Cyres) latch, etc.

The first function generating unit 112 (e.g., first function generating device, first function generating sub-circuit, etc.) receives device unique information CDS of the device 10 from the device information storage unit 111 and/or receives a device ID ID from the first layer 120, but is not limited thereto. The first function generating unit 112 may input the device unique information CDS and/or the device ID ID into at least one function stored in the first function generating unit 112, and for example, the at least one function may be stored in the first function generating unit 112 in advance, but is not limited thereto. Here, the stored function may be a hash-based message authentication code (HMAC), but is not limited thereto. Also, the device ID ID may be a hash value and/or a measurement value of the first layer 120, but is not limited thereto. For example, when a function stored in the first function generating unit 112 is a HMAC function, the device ID ID received by the first function generating unit 112 may be in the form of a hash value of the code of the first layer 120, but the example embodiments are not limited thereto. Additionally, unique device secret data UDS and/or the device ID ID may be input into the HMAC function, but the example embodiments are not limited thereto.

The second function generating unit 113 (e.g., second function generating device, second function generating sub-circuit, etc.) may receive the device unique information CDS of the device 10 from the device information storage unit 111 and may generate a unique endorsement ID UEI based on the device unique information CDS, etc. Here, the second function generating unit 113 may input the device unique information CDS of the device 10 into at least one function stored in the second function generating unit 113, and e.g., at least one second function stored in advance in the second function generating unit 113, and may generate the unique endorsement ID UEI using the second function and the device unique information CDS, but the example embodiments are not limited thereto. For example, the second function generating unit 113 may receive the unique device secret data UDS as an input and may output the unique endorsement ID UEI, etc. Here, the second function stored in the second function generating unit 113 may be a key derivation function (KDF), but is not limited thereto. When the first layer 120 is executed, the second function generating unit 113 may transmit the generated unique endorsement ID UEI to the first layer 120. In addition, the unique endorsement ID UEI is generated from the unique device secret data UDS, and thus, the unique endorsement ID UEI may include unique information input at the time the device 10 is manufactured and/or a desired time of the manufacturer, etc., but the example embodiments are not limited thereto. In addition, the device identify certificate engine 110 may be a memory in the form of read-only memory (ROM), but the example embodiments are not limited thereto.

Referring to FIGS. 2 and 4, the first layer 120 includes an alias key generation unit 121, a device ID generation unit 122, a unique endorsement ID generation unit 123, an alias key certificate generating unit 124, a device ID certificate generating unit 125, and/or a certificate signing request generating unit 126, etc., but is not limited thereto.

The alias key generation unit 121 (e.g., alias key generation device, alias key generation sub-circuit, etc.) receives a device identifier CDI from the DICE 110 and/or firmware information FD from the second layer 130 and generates an alias key based on the device identifier CDI and/or the firmware information FD, but is not limited thereto. The alias key may be generated as an asymmetric pair of an alias private key Alias_SK and an alias public key Alias_PK, but the example embodiments are not limited thereto. Here, an alias key pair including the alias private key Alias_SK and the alias public key Alias_PK may be a temporary key for authenticating device information, and may be transmitted to the second layer 130, but the example embodiments are not limited thereto. Also, the alias public key Alias_PK may be transmitted to the alias key certificate generating unit 124, etc.

The device ID generation unit 122 (e.g., device ID generation device, device ID generation sub-circuit, etc.) receives the device identifier CDI and generates a device private key DEV_SK and/or a device public key DEV_PK based on the device identifier CDI, etc. Here, the device private key DEV_SK and the device public key DEV_PK may be generated as an asymmetric pair, and the device private key DEV_SK and the device public key DEV_PK may configure a device ID, but the example embodiments are not limited thereto. In addition, the device private key DEV_SK may be transmitted to the alias key certificate generating unit 124, and/or the device public key DEV_PK may be transmitted to the device ID certificate generating unit 125, etc. Here, the device ID may be a hash value of a measurement value of the first layer 120, but is not limited thereto.

The unique endorsement ID generation unit 123 (e.g., unique endorsement ID generation device, unique endorsement ID generation sub-circuit, etc.) receives the unique endorsement ID UEI from the DICE 110 and generates an endorsement private key EN_SK and/or an endorsement public key EN_PK based on the unique endorsement ID UEI, etc. Because the unique endorsement ID UEI includes the device unique information CDS of the device 10, the endorsement private key EN_SK and the endorsement public key EN_PK may also be a key pair including unique information for authenticating the device 10. For example, the endorsement private key EN_SK may be transmitted to the device ID certificate generating unit 125 and/or the certificate signing request generating unit 126, and the endorsement public key EN_PK may be transmitted to the certificate signing request generating unit 126, but the example embodiments are not limited thereto. That is, the endorsement private key EN_SK and the endorsement public key EN_PK may each be used as an authentication key for determining whether the first layer 120 has been changed, modified, and/or updated, etc. Accordingly, when the first layer 120 is changed, the endorsement private key EN_SK and the endorsement public key EN_PK may be changed in order to successfully authenticate and/or verify the device 10, etc.

The alias key certificate generating unit 124 (e.g., alias key certificate generating device, alias key certificate sub-circuit, etc.) receives the firmware information FD from the second layer 130, the alias public key Alias_PK, and/or the device private key DEV_SK, etc., and generates an alias certificate Alias_Cert based on the firmware information FD from the second layer 130, the alias public key Alias_PK, and/or the device private key DEV_SK, etc., but the example embodiments are not limited thereto. According to at least one example embodiment, the alias certificate Alias_Cert is obtained by encrypting a device ID, and may be used to check whether the first layer 120 has been updated, modified, and/or changed, etc. For example, the alias certificate Alias_Cert may be a certificate obtained by encrypting information of the device 10, but the example embodiments are not limited thereto. Accordingly, the alias certificate Alias_Cert may be changed when the first layer 120 is changed in order to successfully authenticate and/or verify the device 10, etc.

In addition, the device ID certificate generating unit 125 (e.g., device ID certificate generating device, device ID certificate generating sub-circuit, etc.) receives the device public key DEV_PK and/or the endorsement private key EN_SK and generates a device ID certificate DEVID_Cert based on the device public key DEV_PK and/or the endorsement private key EN_SK, etc. The device ID certificate DEVID_Cert may form a certificate chain with a manufacturer certificate stored in a requester 131 of the second layer 130, and may be used to check whether the first layer 120 has been updated. For example, because the device ID generation unit 122 generates the device private key DEV_SK and the device public key DEV_PK based on the device identifier CDI, the device private key DEV_SK and the device public key DEV_PK may be changed when the first layer 120 has been changed. Accordingly, when the first layer 120 is updated, the device private key DEV_SK and the device public key DEV_PK may be changed, and the device ID certificate DEVID_Cert may be changed. Here, the device ID certificate DEVID_Cert may have an X.509 format, but the example embodiments are not limited thereto. Also, the device ID certificate DEVID_Cert may be generated by signing the endorsement private key EN_SK.

The certificate signing request generating unit 126 (e.g., certificate signing request generating device, certificate signing request generating sub-circuit, etc.) may receive the endorsement public key EN_PK and/or the endorsement private key EN_SK, and may generate an endorsement ID certificate signing request ENID_CSR based on the endorsement public key EN_PK and/or the endorsement private key EN_SK, etc. That is, the endorsement ID certificate signing request ENID_CSR may be generated by signing the endorsement private key EN_SK generated based on the device identifier CDI, but is not limited thereto. The endorsement ID certificate signing request ENID_CSR is provided to the second layer 130. For example, the endorsement ID certificate signing request ENID_CSR may be generated based on the endorsement public key EN_PK and/or the endorsement private key EN_SK, which are generated based on the device identifier CDI, etc. In response to the first layer 120 being changed, the device identifier CDI is changed, and thus the endorsement ID certificate signing request ENID_CSR is also changed. Accordingly, when the first layer 120 is changed, a device ID certificate signing request DEVID_CSR is also changed. As to be described below, the second layer 130 may determine whether the first layer 120 has been changed, updated, and/or modified based on a determination of whether the device ID certificate signing request DEVID_CSR has been changed, and update information of the first layer 120, but the example embodiments are not limited thereto. Also, as to be described below, the endorsement ID certificate signing request ENID_CSR may be used to update a certificate chain in response to the first layer 120 being changed, etc.

Referring to FIGS. 2 and 5, the second layer 130 may include the requester 131 and/or a certificate storage 132, etc., but is not limited thereto.

In response to the first layer 120 being updated, the requester 131 receives information of a certificate chain from the responder 220 and verifies the certificate chain. For example, when the first layer 120 is updated, the requester 131 may verify a root certificate and/or an intermediate certificate of a certificate chain previously stored in the device 10 from the responder 220. According to at least one example embodiment, the requester 131 may verify the signing of the intermediate certificate using a and/or based on a root certificate public key included in the root certificate, and may verify a device certificate based on a public key included in the intermediate certificate when signing verification of the intermediate certificate has been successfully completed. Additionally, the root certificate may be a certificate stored by a manufacturer at the time of manufacturing the device 10, but is not limited thereto, and the intermediate certificate may be a certificate used to verify whether the first layer 120 has been changed. Also, the device certificate may be a certificate including information of the first layer 120, etc. A process of verifying a certificate when the first layer 120 is updated is described in detail with reference to FIG. 9.

The certificate storage 132 may include a plurality of slots including a first slot 132_1, a second slot 132_2, a third slot 132_3, . . . , etc., and may store certificate blocks in one or more of the plurality of slots, but the example embodiments are not limited thereto, and there may be a greater or lesser number of slots included in the certificate storage 132, etc. According to at least one example embodiment, a certificate block may include a root certificate including information of the device 10, an intermediate certificate, and/or a device certificate, etc., but is not limited thereto. The certificate block is described in detail with reference to FIG. 6. However, the number of slots is not limited thereto and may further include an n-th slot 132_n. The requester 131 may check and/or determine whether there is a change in the configuration of the device 10 based on the certificates stored in the plurality of slots. For example, when the first layer 120 is changed by an intermediate producer (e.g., an original equipment manufacturer (OEM)), the requester 131 stores a certificate including new information of the first layer 120 in the plurality of slots.

The certificate storage 132 may control the processor 100 to perform a secure protocol (e.g., a security protocol, an encryption protocol, etc.), which may be stored in advance, but the example embodiments are not limited thereto. For example, the certificate storage 132 may store an SPDM protocol, and in response to the first layer 120 of the processor 100 being updated, the certificate storage 132 may authenticate the updated first layer 120 and control an operation of updating a certificate chain.

Figure 6:
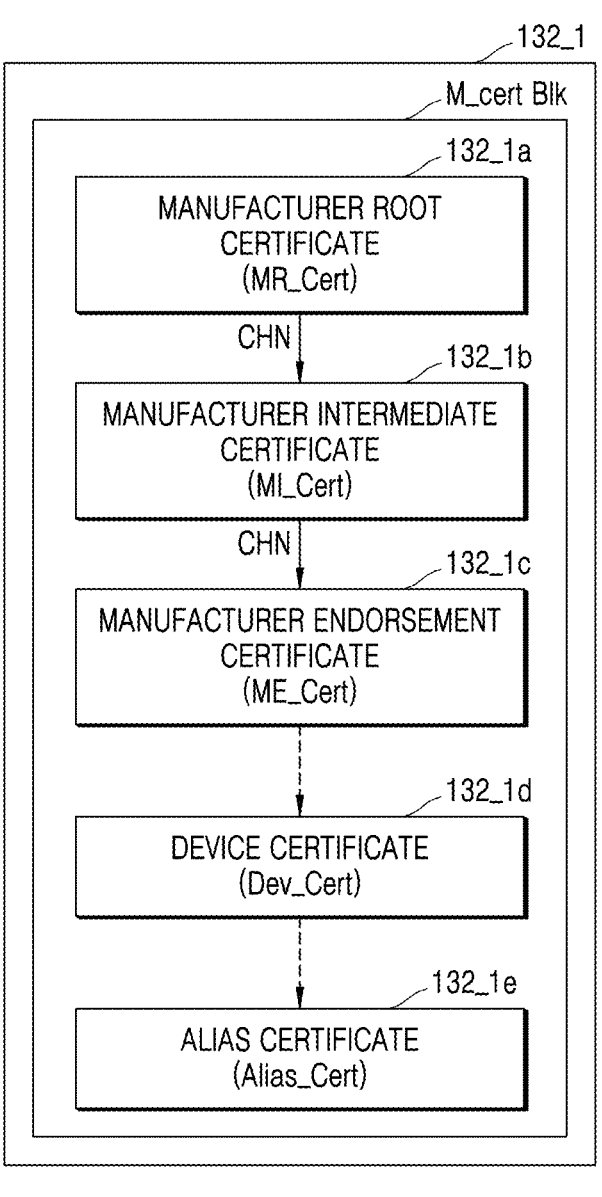
FIG. 6 illustrates a manufacturer certificate block according to at least one example embodiment.

FIG. 6 illustrates a manufacturer certificate block M_cert Blk according to at least one example embodiment.

Referring to FIG. 6, a manufacturer certificate may be stored in the first slot 132_1, but is not limited thereto.

According to at least one example embodiment, a manufacturer root certificate (MR_Cert) 132_1a, a manufacturer intermediate certificate (MI_Cert) 132_1b, and/or a manufacturer approval certificate (ME_Cert) 132_1c formed into a chain CHN (e.g., a certificate chain) and may be stored in the manufacturer certificate block M_cert Blk, and the manufacturer certificate block M_cert Blk may include a device certificate (Dev_Cert) 132_1d and an alias certificate (Alias_Cert) 132_1e, etc., but the example embodiments are not limited thereto.

For example, when the device 10 is manufactured, a manufacturer of the device 10 may store the manufacturer certificate block M_cert Blk including device unique information of the device 10 in the first slot 132_1, but the example embodiments are not limited thereto. The MR_Cert 132_1a may be used to verify the MI_Cert 132_1b based on the signing of the MI_Cert 132_1b and may form the chain CHN. Also, the MI_Cert 132_1b may be used to verify the signing of the ME_Cert 132_1c and may form the chain CHN with the ME_Cert 132_1c. When the MR_Cert 132_1a, the MI_Cert 132_1b, and the ME_Cert 132_1c form the certificate chain CHN, authentication of the device 10 may be successfully completed.

Also, the manufacturer certificate block M_cert Blk may include the Dev_Cert 132_1d issued based on the ME_Cert 132_1a and the Alias_Cert 132_1e issued based on the Dev_Cert 132_1d, but is not limited thereto. For example, when the MR_Cert 132_1a, the MI_Cert 132_1b, and the ME_Cert 132_1c form the certificate chain CHN, the certificate storage 132 may determine that authentication of the device 10 has been successfully completed. Also, the certificate storage 132 may determine that the Dev_Cert 132_1d and the Alias_Cert 132_1e are trusted certificates. Further, when the certificate storage 132 determines that the Dev_Cert 132_1d and the Alias_Cert 132_1e are trusted certificates, the certificate storage 132 may determine that an authentication procedure of the device 10 has been successful. When the authentication procedure of the device 10 is determined to be successful, the certificate storage 132 may trust the processor 100.

Figure 7:
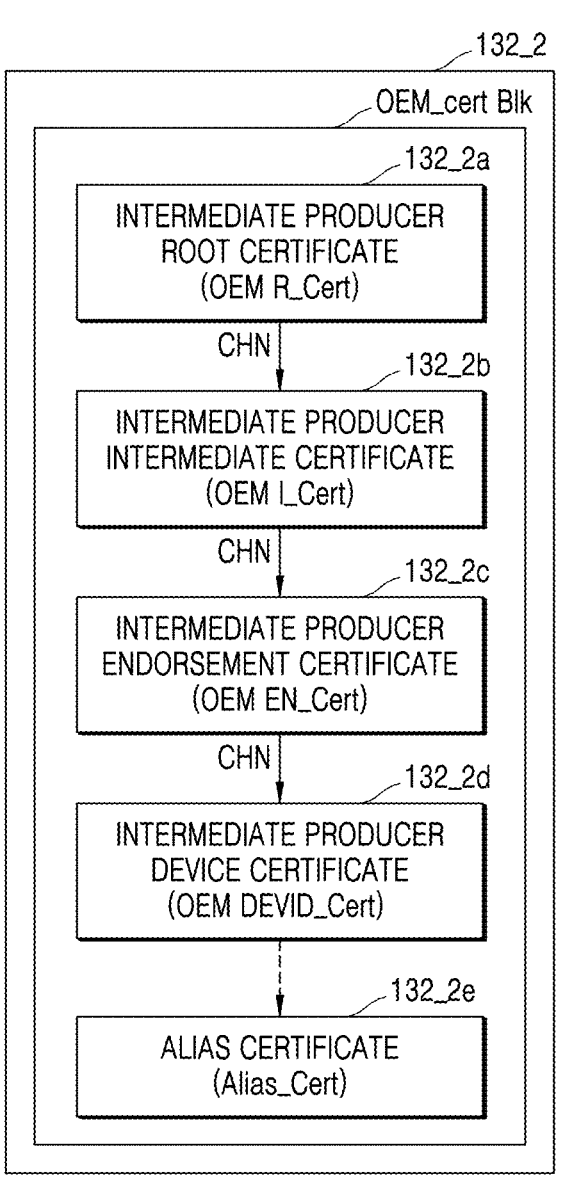
FIG. 7 illustrates an intermediate producer certificate block according to at least one example embodiment.

FIG. 7 illustrates an intermediate producer certificate block OEM_cert Blk according to at least one example embodiment.

Referring to FIG. 7, the intermediate producer certificate block OEM_cert Blk according to at least one example embodiment may be stored in the second slot 132_2, but the example embodiments are not limited thereto. However, the intermediate producer certificate block OEM_cert Blk may be stored in an n-th slot 131_1n, such as the third slot 132_3 and/or a fourth slot, and a customer certificate block may be additionally stored in the n-th slot 132_1n in the same way as will be described below, but the example embodiments are not limited thereto.

According to at least one example embodiment, an intermediate producer root certificate (OEM R_Cert) 132_2a, an intermediate producer intermediate certificate (OEM I_Cert) 132_2b, an intermediate producer approval certificate (OEM EN_Cert) 132_2c, and/or an intermediate producer device certificate (OEM DEVID_Cert) 132_2d may form a certificate chain CHN and may be stored in the intermediate producer certificate block OEM_cert Blk, and the intermediate producer certificate block OEM_cert Blk may further include an alias certificate (Alias_Cert) 132_2e, etc.

For example, when the device 10 is manufactured, an intermediate producer (e.g., an OEM, etc.) of the device 10 may store the intermediate producer certificate block OEM_cert Blk including update information of the device 10 in the second slot 132_2, but the example embodiments are not limited thereto. The OEM R_Cert 132_2a may be used to verify the OEM I_Cert 132_2b by verifying the signing of the OEM I_Cert 132_2b and may form the certificate chain CHN. Also, the OEM I_Cert 132_2b may verify the signing of the OEM EN_Cert 132_2c and may form the certificate chain CHN with the OEM EN_Cert 132_2c, but the example embodiments are not limited thereto. Also, the OEM EN_Cert 132_2c may form the certificate chain CHN with the OEM DEVID_Cert 132_2d by signing of the OEM DEVID_Cert 132_2d, etc. When the certificate storage 132 determines that the OEM R_Cert 132_2a, the OEM I_Cert 132_2b, the OEM EN_Cert 132_2c, and/or the OEM DEVID_Cert 132_2d form the certificate chain CHN, authentication of the device 10 is successfully completed by the certificate storage 132, etc., but the example embodiments are not limited thereto.

Also, the intermediate producer certificate block OEM_cert Blk may include the Alias_Cert 132_2e generated based on the OEM DEVID_Cert 132_2d. Here, in response to determining that the OEM R_Cert 132_2a, the OEM I_Cert 132_2b, the OEM EN_Cert 132_2c, and/or the OEM DEVID_Cert 132_2d form the certificate chain CHN (e.g., are included in the certificate chain CHN, etc.), the certificate storage 132 may determine that an authentication procedure of the device 10 has been successful. Also, in response to the certificate storage 132 determining that authentication of the device 10 has been successfully completed, the certificate storage 132 may determine that the OEM DEVID_Cert 132_2d and the Alias_Cert 132_2e are trusted certificates, etc. In addition, in response to the certificate storage 132 determining that the OEM DEVI-D_Cert 132_2d and the Alias_Cert 132_2e are trusted certificates, the certificate storage 132 may determine that an authentication procedure of the device 10 has been successful. In response to the authentication procedure of the device 10 being completed successfully, the certificate storage 132 may trust the processor 100.

Figure 8:
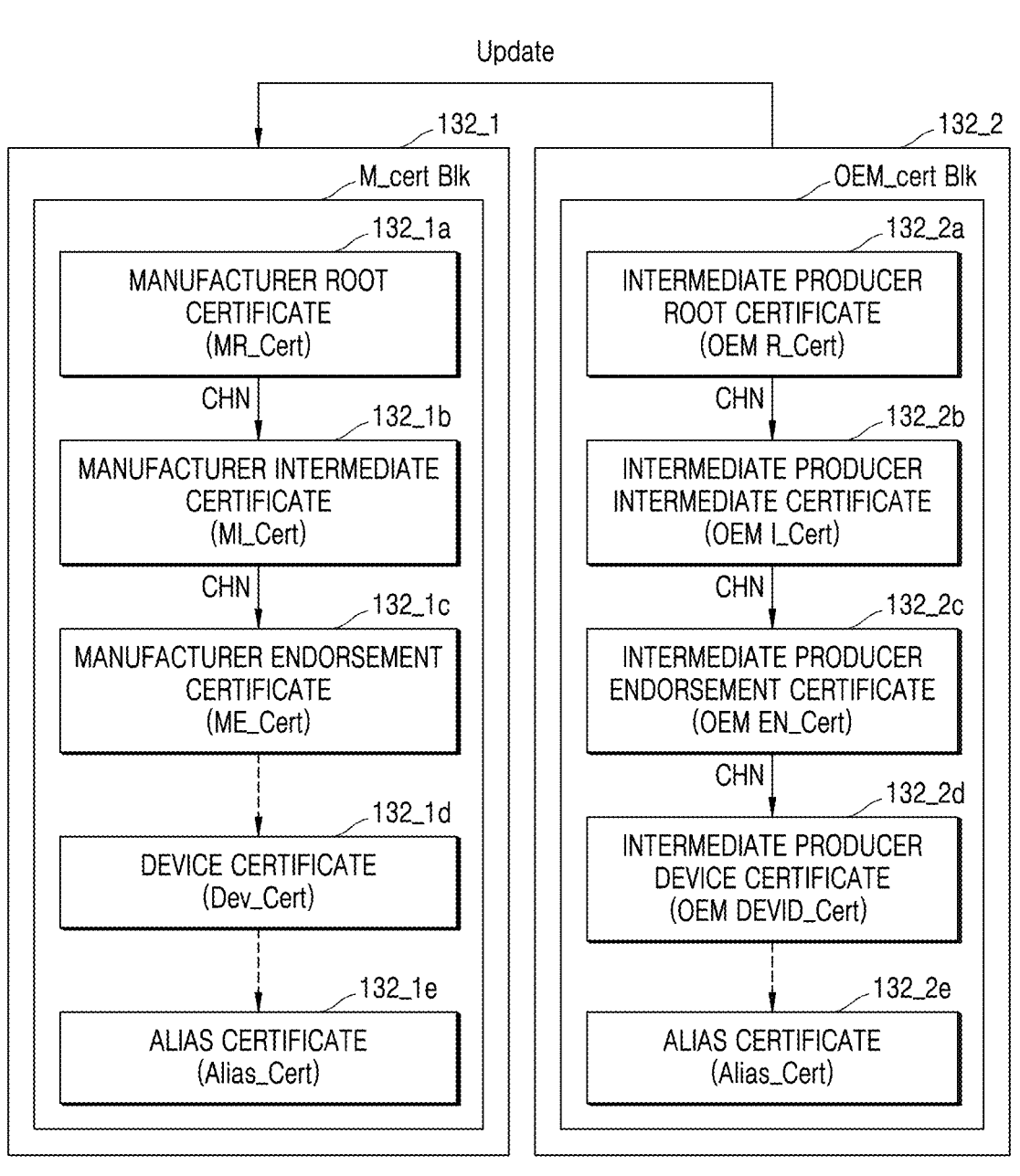
FIG. 8 is a block diagram illustrating updating of a certificate, according to at least one example embodiment.

FIG. 8 is a block diagram illustrating updating of a certificate, according to at least one example embodiment.

Referring to FIG. 8, when the first layer 120 is changed to a layer of an intermediate producer (e.g., an OEM, etc.), the DEV_Cert 132_1d stored in the first layer 120 is also changed, and thus a device certificate must be updated to normally drive and/or operate the device 10, etc. Here, in at least one example embodiment, any one of the OEM DEVI-D_Cert 132_2d and/or the Alias_Cert 132_2e may be used, etc. For example, in response to the first layer 120 being changed by an intermediate producer, the device 10 may generate an error when the MR_Cert 132_1a, the MI_Cert 132_1b, and/or the DEV_Cert 132_1d are used (e.g., the original certificates, etc.). Accordingly, in response to the first layer 120 being changed, the requester 131 may detect and/or determine that the first layer 120 has been changed. and the certificate storage 132 may request for any one of the OEM DEVID_Cert 132_2d and the Alias_Cert 132_2e, etc. Here, the requester 131 provides any one of the OEM DEVID_Cert 132_2d and the Alias_Cert 132_2e, and thus a certificate chain of the device 10 may be updated, and the update of the first layer 120 of the device 10 may be successfully authenticated.

That is, in response to the first layer 120 of the device 10 according to at least one example embodiment being updated, the processor 100 may determine whether the first layer 120 was changed, modified, and/or updated based on a first certificate stored in the first slot 132_1, and the processor 100 may receive changed authentication information and/or update information of a second certificate including a changed certificate chain in the second slot 132_2 based on the results of the determination of whether the first layer 120 was changed, modified, and/or updated, etc. Here, the first certificate may be the DEV_Cert 132_1d, and the second certificate may be defined as the OEM DEV_Cert 132_2d or the Alias_Cert 132_2e issued based on the OEM DEV_Cert 132_2d, but the example embodiments are not limited thereto.

Figure 9A:
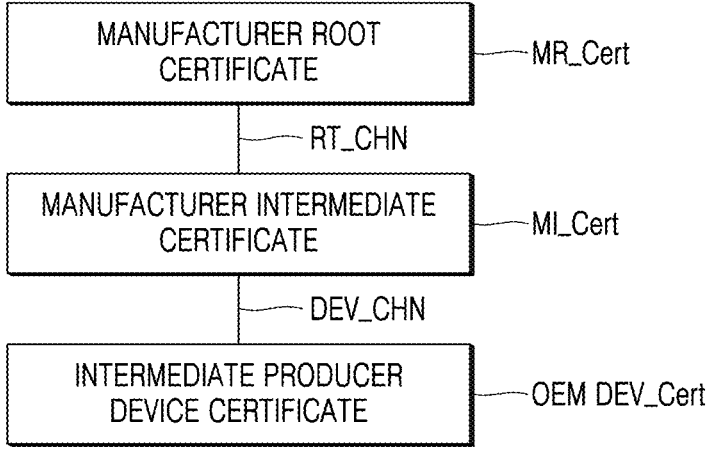
FIGS. 9A and 9B illustrate that certificates are combined with a chain, according to at least one example embodiment.
Figure 9B:
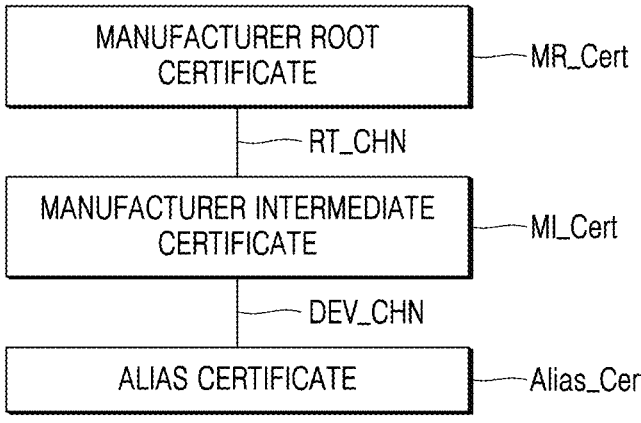

FIGS. 9A and 9B illustrate that certificates are combined into a chain, according to some example embodiments.

Referring to FIGS. 9A and 9B, when the first layer 120 is updated, at least one error may occur during a booting operation of the device 10, or in other words, the device 10 may fail to boot properly after the first layer 120 has been updated, changed, modified, etc., because the device 10 fails a secure boot verification operation due to a mismatch between the original certificates stored in the memory of the device 10 and the unauthenticated certificate(s) of the updated first layer 120. Accordingly, it is desired to update the certificate information of an intermediate producer in order to perform a normal booting operation of the device 10, etc.

FIG. 9A illustrates that a device certificate of an intermediate producer is updated to and/or based on a certificate issued by a manufacturer or the like. The manufacturer may store a manufacturer root certificate MR_Cert and/or a manufacturer intermediate certificate MI_Cert in the certificate storage 132 when the device 10 is first manufactured, but the example embodiments are not limited thereto. For example, the manufacturer root certificate MR_Cert may be used to verify signing of the manufacturer intermediate certificate MI_Cert and may be used to generate a root chain RT_CHN. Also, when the intermediate producer (e.g., OEM) updates the first layer 120, the manufacturer intermediate certificate MI_Cert may be used to verify a signing of an intermediate producer device certificate OEM DEV_Cert and may be connected to the intermediate producer device certificate OEM DEV_Cert through a device chain DEV_CHN, etc. Additionally, the manufacturer root certificate MR_Cert, the manufacturer intermediate certificate MI_Cert, and/or the intermediate producer device certificate OEM DEV_Cert may be combined into a certificate chain, the certificate storage 132 may determine that an authentication procedure is successful, and trust the first layer 120 changed by the intermediate producer.

FIG. 9B illustrates that a device certificate of an intermediate producer is updated by the alias certificate Alias_Cert using and/or based on a certificate issued by a manufacturer or the like. As described above with reference to FIG. 9A, the manufacturer may store the manufacturer root certificate MR_Cert and/or the manufacturer intermediate certificate MI_Cert in the certificate storage 132 when the device 10 is first manufactured, but the example embodiments are not limited thereto. For example, the manufacturer root certificate MR_Cert may be used to verify a signature of the manufacturer intermediate certificate MI_Cert and may be used to generate a root chain RT_CHN, etc. Also, when the intermediate producer (e.g., OEM) updates the first layer 120, the manufacturer intermediate certificate MI_Cert may be used to verify the signing of the intermediate producer device certificate OEM DEV_Cert and may be connected to the alias certificate Alias_Cert generated based on the intermediate producer device certificate OEM DEV_Cert, etc. When the manufacturer root certificate MR_Cert, the manufacturer intermediate certificate MI_Cert, and the alias certificate Alias_Cert are successfully combined to form a certificate chain, the certificate storage 132 may determine that an authentication procedure is successful, and may trust the first layer 120 changed by the intermediate producer based on the successful results of the authentication procedure.

Figure 10:
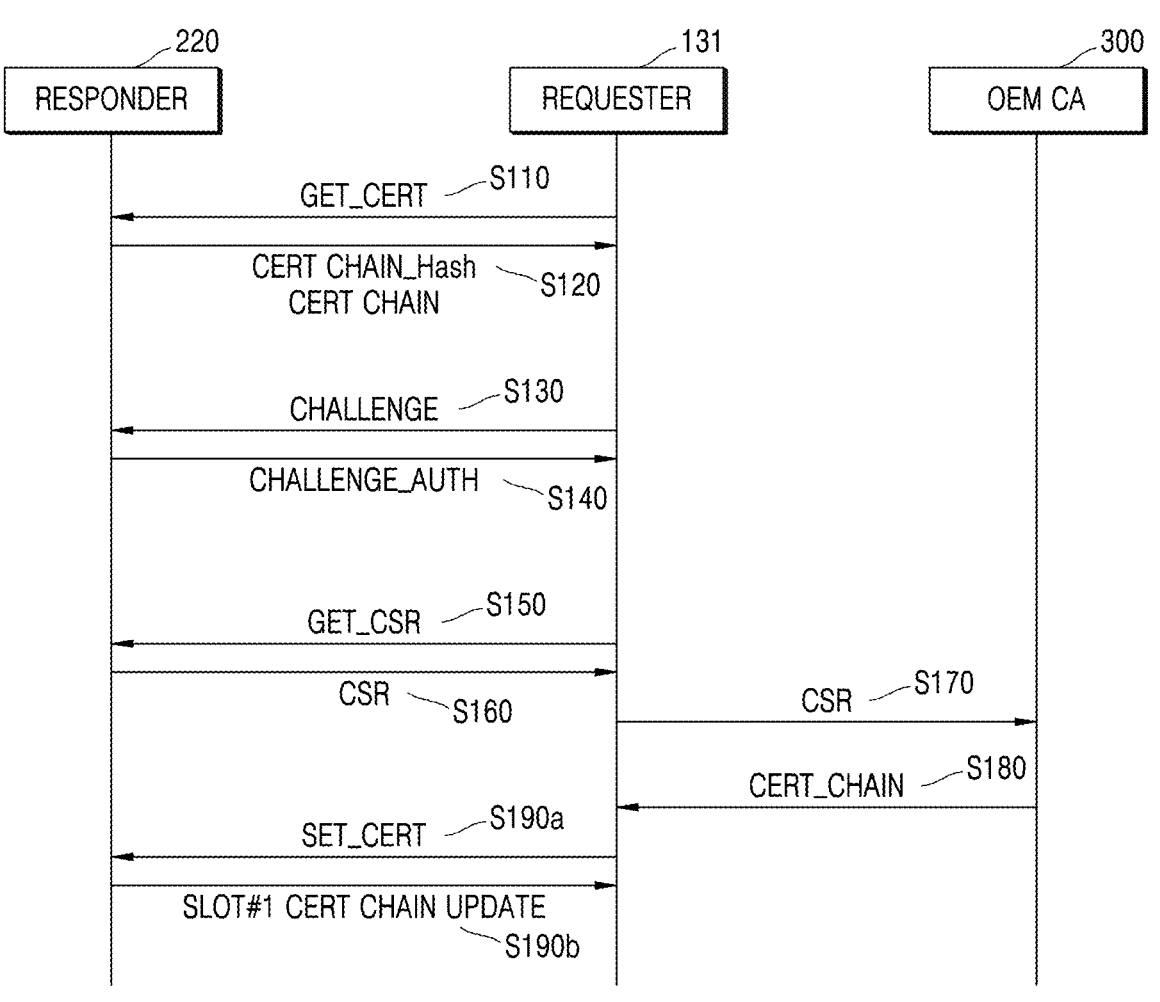
FIG. 10 is a flowchart illustrating a method of updating a certificate, according to at least one example embodiment.

FIG. 10 is a flowchart illustrating a method of updating a certificate, according to at least one example embodiment.

Referring to FIG. 10, in response to the first layer 120 of the processor 100 being changed, the device 10 may not normally operate. Accordingly, in operation S1101, the requester 131 transmits a certificate request signal GET_CERT to the responder 220.

In response to the certificate request signal GET_CERT being received, the responder 220 may provide hash data of a certificate chain CERT CHAIN_Hash and/or certificate chain data CERT_CHAIN to the requester 131 in operation S120.

In response to the hash data of a certificate chain CERT CHAIN_Hash and/or the certificate chain data CERT_CHAIN being received, the requester 131 may detect and/or determine that the first layer 120 has been changed, and may request a challenge CHALLENGE message from the responder 220 to update a certificate chain in operation S1301. Here, the challenge CHALLENGE may mean a portion of a certificate chain verification operation for updating a certificate chain, but the example embodiments are not limited thereto.

In operation S140, the responder 220 may receive the challenge CHALLENGE and may make and/or generate a challenge approval CHALLENGE_AUTH message, etc. The challenge approval CHALLENGE_AUTH message may include changed information from the first layer 120, but is not limited thereto. The challenge approval CHALLENGE_AUTH message may be generated based on a device private key DEV_SK, but is not limited thereto.

In operation S150, the requester 131 may transmit a certificate signing request provision signal GET_CSR to the responder 220 in response to the challenge approval CHALLENGE_AUTH message, and the responder 220 may provide a certificate signing request CSR of the device 10 to the requester 131 in operation S160. Here, the certificate signing request CSR may be newly generated by the responder 220 in response to the first layer 120 being changed, or in other words, the responder 220 may determine whether the first layer 120 was changed, modified, and/or updated, and may generate the certificate signing request CSR based on the results of the determination. In addition, the certificate signing request CSR may include a public key and/or a unique serial number of the device 10, and may be signed by the responder 220 using a private key of the device 10, but the example embodiments are not limited thereto. Additionally, according to some example embodiments, the certificate signing request CSR may be information issued and/or stored by a manufacturer and/or other similar entity.

In operation S170, in response to receiving the certificate signing request CSR, the requester 131 may transmit the received certificate signing request CSR to an intermediate producer certificate authority (e.g., OEM CA) 300. Also, in response to receiving the certificate signing request CSR, the OEM CA 300 may transmit a certificate chain CERT_CHAIN to the requester 131 in operation S180. The certificate chain CERT_CHAIN may be a chain of certificates generated by the intermediate producer and may be different from a device certificate generated by a manufacturer. That is, the requester 131 may transmit the certificate signing request CSR to the OEM CA 300 and may receive a new certificate chain, thereby updating a certificate.

In operation S190*a*, the requester 131 may transmit a new certificate setting signal SET_CERT to the responder 220 after receiving the certificate chain CERT_CHAIN from the OEM CA 300. In operation S190*b*, the responder 220 may store a new certificate chain in the second slot 132_2 of the second layer 130 (e.g., SLOT #1 CERT CHAIN UPDATE) and may update a new certificate, but is not limited thereto. However, a slot in which a new certificate is updated is not limited to the second slot 132_2, but may include the third slot 132_3 or the n-th slot 132_*n*, etc.

Figure 11:
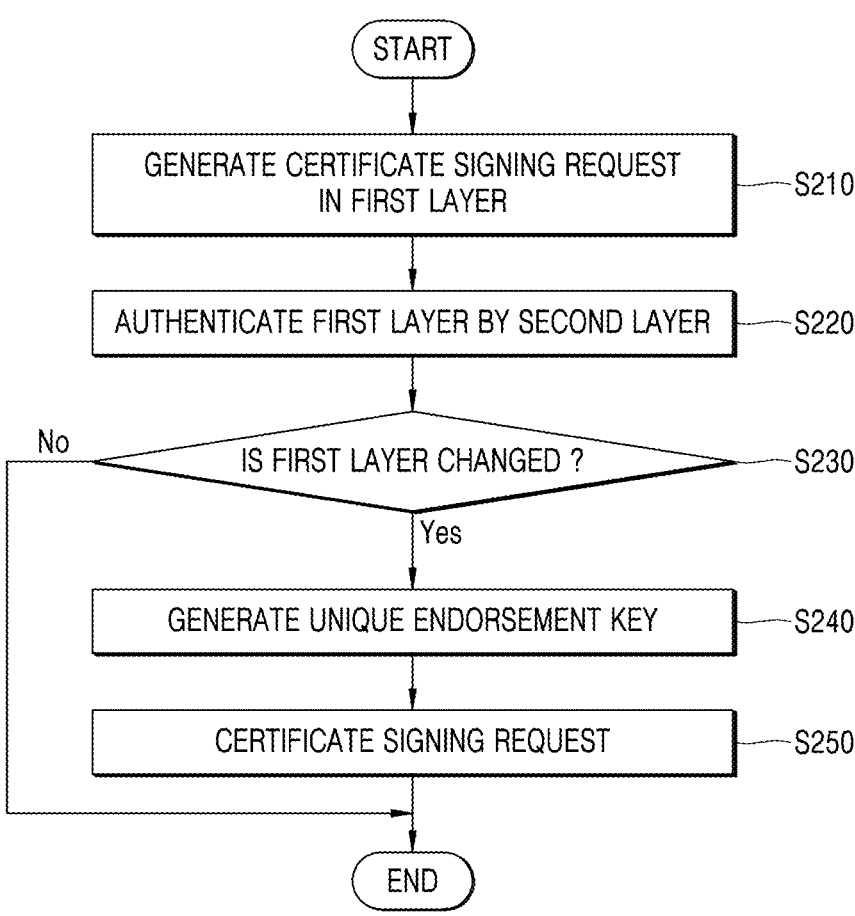
FIG. 11 is a flowchart illustrating a process of generating a certificate signing request in a method of updating a certificate, according to at least one example embodiment.

FIG. 11 is a flowchart illustrating a process of generating a certificate signing request in a method of updating a certificate, according to at least one example embodiment.

Referring to FIG. 11, in operation S210, the first layer 120 may generate a certificate signing request CSR. For example, the certificate signing request CSR may include a request for a signature associated with and/or corresponding to a device ID of an intermediate producer, but the example embodiments are not limited thereto. In addition, as described above, the certificate signing request CSR may be generated based on the unique endorsement ID UEI of a device, and the unique endorsement ID UEI of the device may be generated by the first layer 120 based on the device identifier CDI, and thus, the certificate signing request CSR may be newly generated in response to the first layer 120 being changed. In addition, the certificate signing request CSR may include a public key and/or a unique serial number of the device 10, etc., but is not limited thereto. For example, the device ID may be a hash value of a measurement value of the first layer 120, but the example embodiments are not limited thereto.

In operation S220, the first layer 120 may transmit the certificate signing request CSR to the second layer 130, and the second layer 130 may authenticate the first layer 120. As will be described below, the updating of the first layer 120 may include the second layer 130 determining whether the first layer 120 has been changed, updated, and/or modified, receiving changed authentication information, and/or storing information associated with a second certificate including a changed certificate chain in the second slot 132_2, in response to results of the determination indicating that the first layer 120 has been changed. For example, the second layer 130 may receive the certificate signing request CSR from the first layer 120 and may generate an intermediate producer device certificate OEM DEV_Cert chain corresponding to the certificate signing request CSR, but is not limited thereto. Also, the second slot 132_2 may store updated device ID certificate chain information, but is not limited thereto.

In operation S230, the processor 100 may determine whether the first layer 120 has been changed based on the results of the authentication of the device 10.

In operation S240, in response to the determination that the first layer 120 has been changed, modified, updated, etc., the device identify certificate engine 110 may generate a unique endorsement ID UEI of a changed device, and the first layer 120 may generate a unique endorsement key based on the unique endorsement ID UEI. For example, the unique endorsement key may include the endorsement private key EN_SK and/or the endorsement public key EN_PK, and the endorsement private key EN_SK and the endorsement public key EN_PK may be generated as an asymmetric pair, but the example embodiments are not limited thereto.

In operation S250, in response to the unique endorsement key being generated, the certificate signing request generating unit 126 of the first layer 120 may generate a certificate signing request CSR including information of the changed first layer 120.

However, if it is determined that the first layer 120 has not been changed, the certificate storage 132 may end the update process without undergoing a separate procedure.

Figure 12:
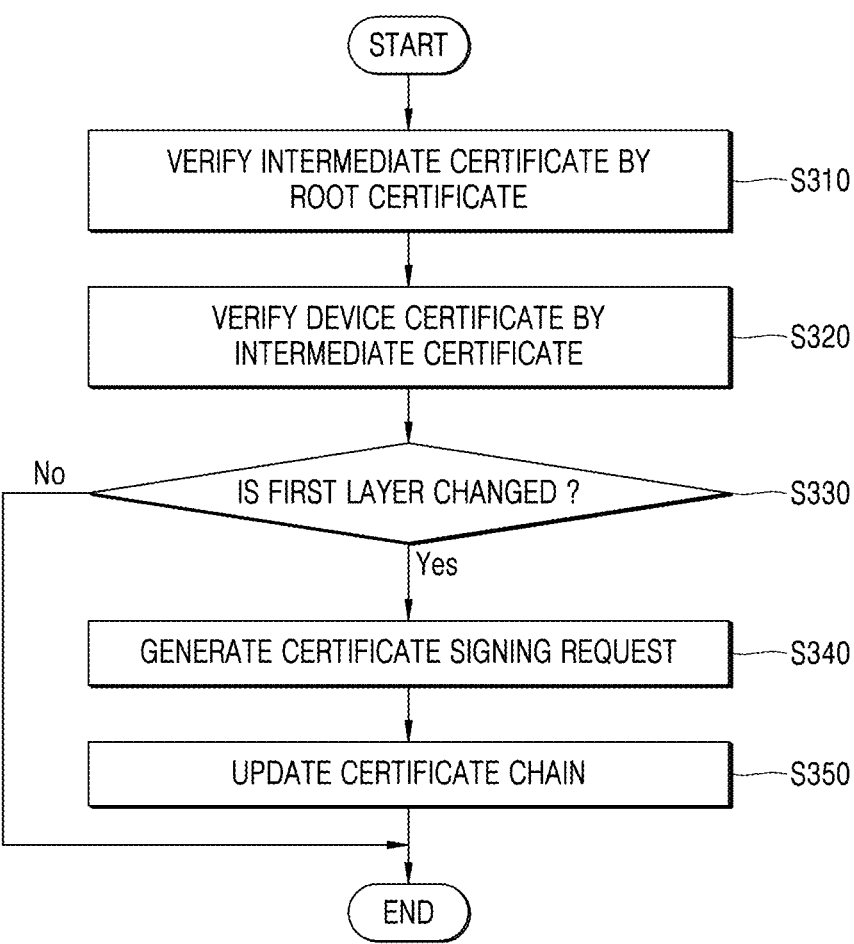
FIG. 12 illustrates a process of updating a certificate chain in a method of updating a certificate, according to at least one example embodiment.

FIG. 12 illustrates a process of updating a certificate chain in a method of updating a certificate, according to at least one example embodiment.

Referring to FIG. 12, once the device 10 has been booted, the requester 131 may perform an authentication procedure of the first layer 120, but is not limited thereto.

In operation S310, the requester 131 may verify an intermediate certificate on the basis of and/or based on a root certificate stored in the certificate storage 132. The requester 131 may use the root certificate to generate a certificate signing request to the intermediate certificate, and in response to the signature of the intermediate certificate being verified, the root certificate may trust the intermediate certificate. In addition, in response to the requester 131 determining the verification of the intermediate certificate was successful, the requester 131 may combine the root certificate and the intermediate certificate to form a chain, but is not limited thereto.

According to at least one example embodiment, the root certificate and/or the intermediate certificate may be certificates issued by a manufacturer, but are not limited thereto. For example, when a second intermediate producer (e.g., an assembler, etc.) updates a device produced by a first intermediate producer, certificates stored in a certificate authority may be certificates issued by the first intermediate producer, etc.

In operation S320, in response to the verification of the intermediate certificate being completed, the requester 131 may use the intermediate certificate to verify a device certificate, etc. The requester 131 may use the intermediate certificate to generate a certificate signing request of the device certificate. Additionally, the requester 131 may verify a signature of the device certificate, the requester 131 may update the intermediate certificate to indicate that the device certificate is trusted. In addition, the requester 131 may combine the intermediate certificate and the device certificate to form a chain in response to the successful verification of the device certificate, but the example embodiments are not limited thereto.

According to at least one example embodiment, in operation S330, the requester 131 may determine whether the first layer 120 has been changed as a result of verifying the device certificate.

In response to a determination that the first layer 120 has been changed, the requester 131 may transmit a certificate signing request generating command to the first layer 120, and the certificate signing request generating unit 126 of the first layer 120 may generate the certificate signing request CSR in operation S340. For example, the certificate signing request CSR may be generated based on the endorsement private key EN_SK and/or the endorsement public key EN_PK of the device 10, and may include information of the unique endorsement ID UEI of the device 10, but the example embodiments are not limited thereto.

In operation S350, in response to the certificate signing request CSR being generated, the second layer 130 may receive the certificate signing request CSR and update a certificate chain. Here, the certificate chain may be generated by the second layer 130 based on a signature of an intermediate producer device certificate, but the example embodiments are not limited thereto. In response to the manufacturer root certificate MR_Cert, the manufacturer intermediate certificate MI_Cert, and/or the intermediate producer device certificate OEM DEV_Cert chains being formed, and the chains being successfully combined, the requester 131 may determine that an authentication procedure was successful, and may trust the first layer 120 changed, modified, and/or updated by the intermediate producer, etc. In other words, the requester 131 may authenticate the first layer 120 after a change, update, and/or modification (e.g., may determine whether the first layer 120 may be trusted, etc.) by examining and/or analyzing the manufacturer root certificate MR_Cert, the manufacturer intermediate certificate MI_Cert, and/or the intermediate producer device certificate OEM DEV_Cert chains, etc.

However, in response to the requester 131 determining that the first layer 120 has not been changed, the requester 131 may end the update process without undergoing a separate procedure.

Figure 13:
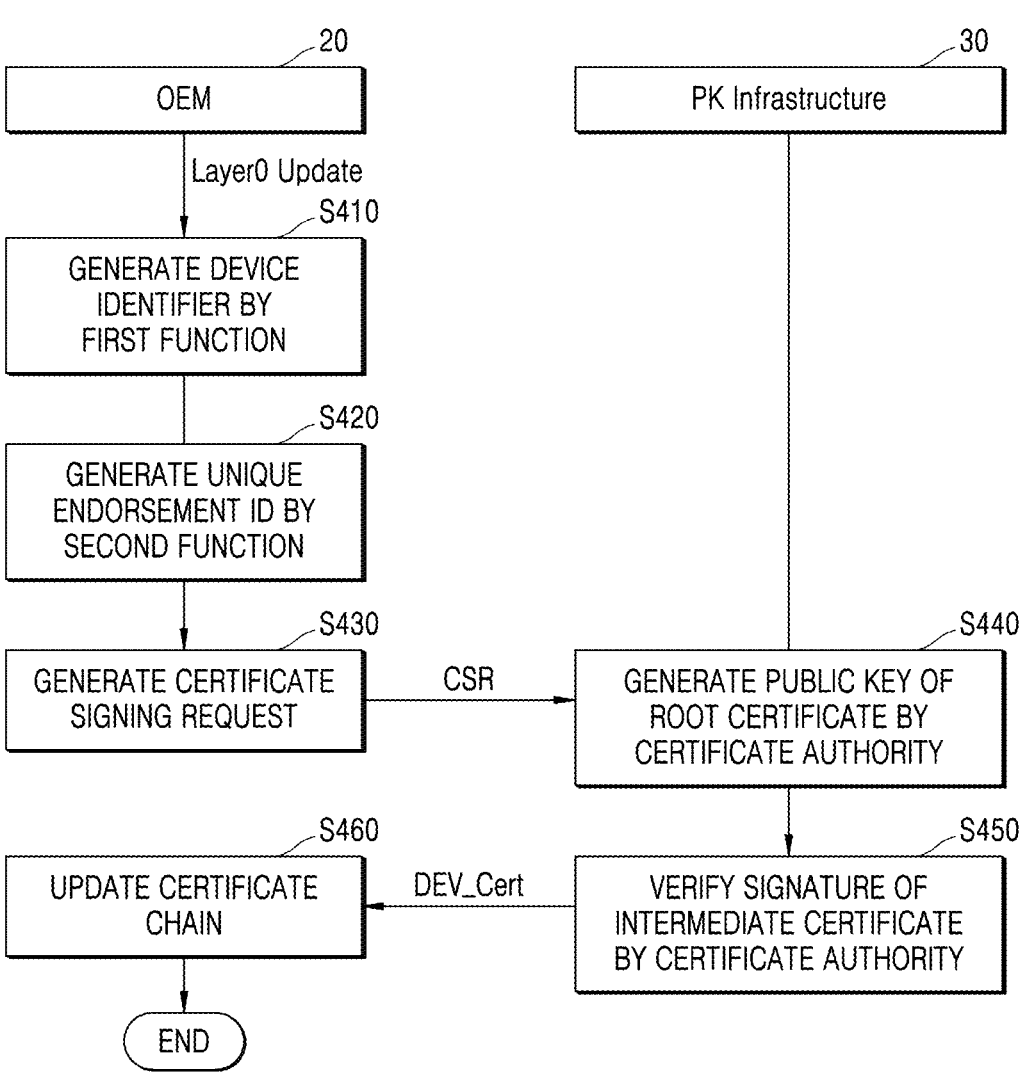
FIG. 13 illustrates a process of verifying and updating a certificate in a method of updating a certificate, according to at least one example embodiment.

FIG. 13 illustrates a process of verifying and updating a certificate in a method of updating a certificate, according to at least one example embodiment.

FIG. 13 illustrates a process of updating a certificate chain in terms of verification of a certificate by a certificate generated by an OEM 20 and a public key generated by a PKI 30, but the example embodiments are not limited thereto.

Referring to FIG. 13, in response to the first layer (Layer 0) 120 being updated and/or changed, the device identify certificate engine 110 manufactured by a manufacturer generates a device identifier CDI using a first function in operation S410. Here, the first function may be an HMAC function, and the device identifier CDI may be generated based on the device unique information CDS and/or the device ID ID of the first layer 120, but the example embodiments are not limited thereto.

In operation S420, the device identify certificate engine 110 may generate a unique endorsement ID UEI using a second function in response to the device identifier CDI being generated. The unique endorsement ID UEI may be a value output as a result of inputting the device unique information CDS into the second function, but is not limited thereto. Here, the second function may be a KDF function, but is not limited thereto.

In response to the device identifier CDI and the unique endorsement ID UEI being generated, the first layer 120 may generate the certificate signing request CSR in operation S430. Here, the certificate signing request CSR may include information of a device unique endorsement ID certificate EN_Cert, etc.

In operation S440, the requester 131 may generate a first public key of a root certificate in response to the certificate signing request CSR. A Certificate Agent may include the requester, but the example embodiments are not limited thereto. Here, the root certificate refers to a certificate stored in the requester 131 which authenticates and/or indicates whether the first layer 120 has been changed, and the public key of the root certificate may be used to verify whether a first certificate issued by the manufacturer has been changed, but the example embodiments are not limited thereto.

In operation S450, the requester 131 may verify a signature of an intermediate certificate in response to the public key being generated, etc. The intermediate certificate and the root certificate may be combined through a chain, but the example embodiments are not limited thereto.

In operation S460, the requester 131 may verify a signature of the intermediate certificate, and the second layer 130 may update a certificate chain in response to the signature verification result of the requester 131. That is, the requester 131 may update a changed certificate by storing a chain of the changed device unique endorsement ID certificate EN_Cert and/or the alias certificate Alias_Cert while maintaining the chain of the intermediate certificate and/or the root certificate, etc.

Figure 14:
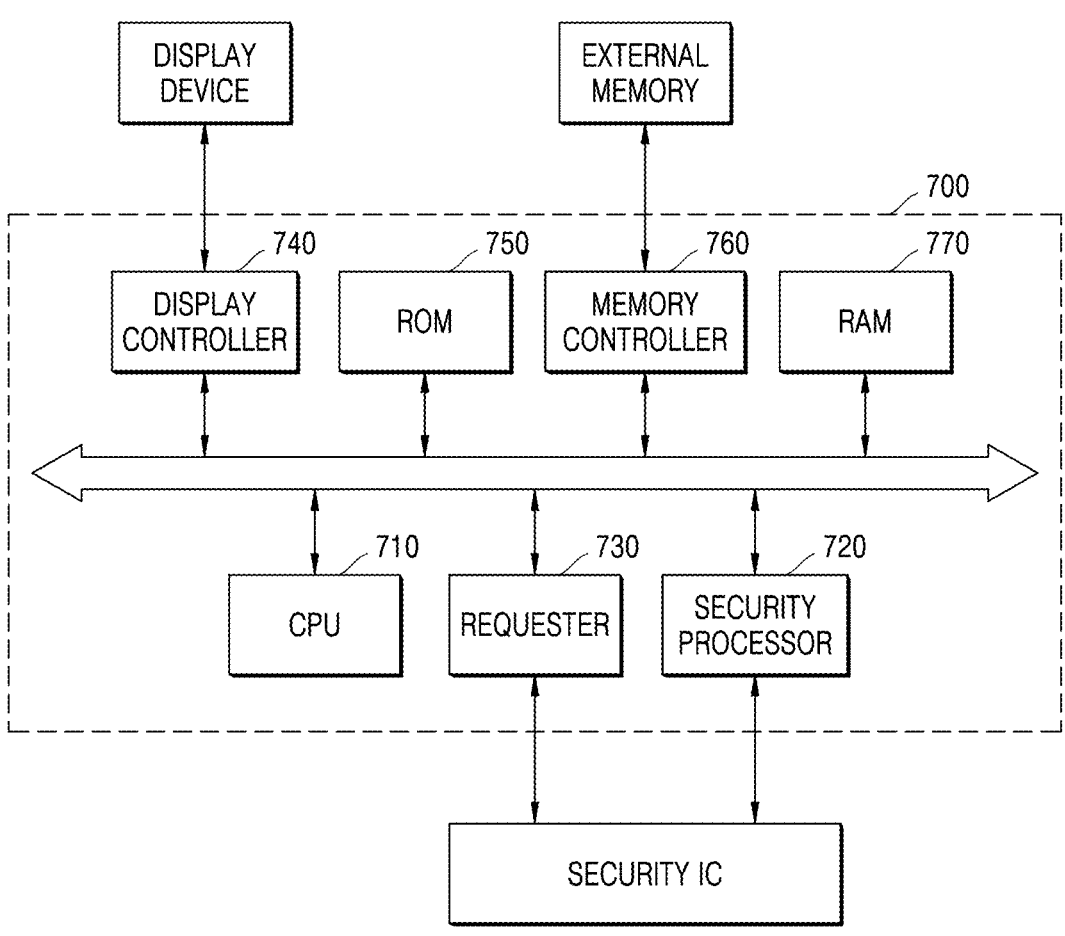
FIG. 14 illustrates an example implementation of a processor according to at least one example embodiment.

FIG. 14 is a block diagram illustrating an example of the processor 100 according to at least one example embodiment.

Referring to FIG. 14, an application processor 700 may be implemented as a system-on-chip (SoC), and the application processor 700 may be mounted on the device according to some example embodiments to control the overall operation of the device, but the example embodiments are not limited thereto. The application processor 700 may include a central processing unit (CPU) 710, a security processor 720, a requester 730, a display controller 740, ROM 750, a memory controller 760, and/or RAM 770, etc. The application processor 700 may further include other components, for example, a power management unit, a graphics processing unit (GPU), a clock unit, or the like, in addition to the components illustrated.

The CPU 710 may process and/or execute programs and/or data stored in the ROM 750 and/or the RAM 770. For example, the CPU 710 may process and/or execute the programs and/or data according to an operation clock. The CPU 710 may be implemented as a multi-core processor, but is not limited thereto. A multi-core processor is one computing component having two or more independent processors (e.g., cores), and each of the two or more processors may read and/or execute program instructions, etc.

The ROM 750 may non-volatilely store programs and/or data. The ROM 750 may be implemented as erasable programmable read-only memory (EPROM) and/or electrically erasable programmable read-only memory (EEPROM), but is not limited thereto. Also, the RAM 770 may temporarily store programs, data, and/or instructions. For example, programs and/or data stored in the ROM 750 may be temporarily stored in the RAM 770 under control by the CPU 710, etc. The RAM 770 may be implemented as a memory, such as dynamic RAM (DRAM), static RAM (SRAM), or the like.

The memory controller 760 performs a function of interfacing with an external memory device, and controls the external memory device according to a data access request to write and/or read data. Also, the display controller 740 may control a display operation of a screen by driving a display device.

According to at least one example embodiment, the application processor 700 may communicate with a security storage (or security IC) which may be implemented as an external separate semiconductor chip, but the example embodiments are not limited thereto. When the application processor 700 is initially driven, a mutual authentication process may be performed with respect to the application processor 700 and the security storage according to at least one example embodiment. According to at least one example embodiment, as the mutual authentication succeeds, the application processor 700 and the security storage may perform encrypted communication using a symmetric key or the like.

Also, according to at least one example embodiment, the security processor 720 and the requester 730 of the application processor 700 perform various operations for public key-based communication. For example, the application processor 700 may provide a request to the security storage so that at least some of a plurality of functions related to public key-based communication are performed in the security storage. According to at least one example embodiment, an important operation that desires and/or requires relevant information not to be exposed to the outside, such as an electronic signature for a certificate, a device private key, or the like, may be performed in the security storage.

While various example embodiments of the inventive concepts have been particularly shown and described, it will be understood that various changes in form and details may be made therein without departing from the spirit and scope of the following claims.

What is claimed is:

1. A device comprising:
   processing circuitry configured to,
      generate a device identifier associated with the device, and
      generate a unique endorsement identity associated with the device identifier;
   a first layer sub-circuit configured to,
      receive the device identifier, and
      generate a first certificate and a second certificate based on the device identifier and the unique endorsement identity, the first certificate and the second certificate including information to authenticate the device; and
   the processing circuitry is further configured to,
      receive the first certificate and the second certificate, and
      verify whether the device has been modified based on the first certificate and the second certificate,
   wherein, in response to the first layer sub-circuit being modified, the first layer sub-circuit is further configured to,
      generate an endorsement key based on a new unique endorsement identity, and
      generate a certificate signing request for the new unique endorsement identity based on the endorsement key.

2. The device of claim 1, wherein the processing circuitry is further configured to generate the device identifier by inputting unique device secret data into a first function.

3. The device of claim 2, wherein the processing circuitry is further configured to generate the unique endorsement identity by inputting the unique device secret data into a second function.

4. The device of claim 1, wherein the first layer sub-circuit is further configured to generate an endorsement private key and an endorsement public key.

5. The device of claim 4, wherein the first layer sub-circuit is further configured to generate an endorsement certificate signing request based on the endorsement private key and the endorsement public key.

6. The device of claim 1, wherein the processing circuitry is further configured to verify whether the first layer sub-circuit has been modified based on the second certificate and the certificate signing request.

7. The device of claim 6, wherein the first layer sub-circuit is further configured to:
   determine whether the first layer sub-circuit has been modified; and
   update a certificate chain based on the certificate signing request and results of the determination.

8. A method of updating a device certificate, the method comprising:
   generating a device identifier associated with a desired device;
   generating a unique endorsement identity associated with the device identifier;
   transmitting the device identifier to a first layer sub-circuit, the transmitting causing the first layer sub-circuit to,
      generate a first certificate and a second certificate based on the device identifier and the unique endorsement identity, the first certificate and the second certificate including information to authenticate the desired device;
   receiving the first certificate and the second certificate; and
   verifying whether the desired device has been modified based on the first certificate and the second certificate,
   wherein, in response to the first layer sub-circuit being modified, the first layer sub-circuit is further caused to generate the first certificate and the second certificate by generating an endorsement key based on a new unique endorsement identity, and generating a certificate signing request for the new unique endorsement identity based on the endorsement key.

9. The method of claim 8, wherein the generating the device identifier further comprises generating the device identifier by inputting unique device secret data into a first function.

10. The method of claim 9, wherein the generating the unique endorsement identity further comprises generating the unique endorsement identity by inputting the unique device secret data into a second function.

11. The method of claim 8, wherein the generating the endorsement key further comprises generating an endorsement private key and an endorsement public key.

12. The method of claim 11, wherein the generating the first certificate and the second certificate: further comprises generating an endorsement certificate signing request based on the endorsement private key and the endorsement public key.

13. The method of claim 8, wherein the verifying whether the desired device has been modified further comprises determining whether the first layer sub-circuit has been modified based on the first certificate, the second certificate, and the certificate signing request.

14. The method of claim 13, wherein the verifying whether the desired device has been modified further comprises updating a certificate chain of the desired device based on the certificate signing request and results of determining whether the first layer sub-circuit has been modified.

15. A method comprising:

verifying an intermediate certificate based on a root certificate combined with the intermediate certificate to form a root certificate chain;

determining whether a bootloader of a device has been modified by verifying a device certificate based on the intermediate certificate combined with the device certificate to form a device certificate chain; and updating the device certificate chain based on a device certificate signing request, the device certificate signing request generated based on a unique endorsement identity associated with a device identifier associated with the device, and results of the determining whether the bootloader of the device has been modified, wherein the updating the device certificate chain includes, combining a new device certificate and the intermediate certificate, verifying a modification of the bootloader included in the device based on the root certificate, the intermediate certificate, and the device certificate signing request, and updating the device certificate chain based on the device certificate signing request in response to results of determining whether the bootloader has been modified.

16. The method of claim 15, further comprising:

generating the device identifier associated with the device; and generating the unique endorsement identity associated with the device identifier by inputting unique device secret data into a first function and a second function, respectively.

17. The method of claim 15, wherein the updating of the device certificate chain comprises:

generating an endorsement private key and an endorsement public key; and generating an endorsement key based on the endorsement private key and the endorsement public key.

18. The method of claim 17, wherein the updating of the device certificate chain further comprises:

generating an endorsement certificate signing request based on the endorsement private key and the endorsement public key.

* * * * *